United States Patent Office 3,255,068
Patented June 7, 1966

3,255,068
LAMINATED ARTICLE BONDED BY A CURABLE POLYURETHANE ELASTOMER AND AN ORGANIC POLYISOCYANATE AND PROCESS OF MANUFACTURE
Walter Fairbairn Smith, Manchester, England, assignor to Imperial Chemical Industries Limited, London, England, a corporation of Great Britain
No Drawing. Filed Oct. 25, 1961, Ser. No. 147,479
Claims priority, application Great Britain, Nov. 1, 1960, 37,515/60; Dec. 19, 1960, 43,567/60
13 Claims. (Cl. 161—190)

This invention relates to improvements in or relating to the manufacture of laminated articles.

It is already known to use solutions containing organic diisocyanate-modified polyesteramides and organic diisocyanates for adhesive purposes.

It has now been found that solutions of particular organic diisocyanate-modified polyesteramides and organic polyisocyanates are particularly valuable for use as adhesives, especially in the preparation of laminated articles from polyurethane foam. These specific organic diisocyanate-modified polyesteramides give adhesive compositions which remain in a usable form for 16 to 24 hours and give bonds possessing exceptional mechanical strength and hydrolytic stability.

Thus according to the present invention there is provided a process for the manufacture of laminated articles in which two or more layers of material are bonded together using a curable adhesive composition comprising a solution of a polyurethane elastomer and an organic polyisocyanate, characterised in that said polyurethane elastomer is the reaction product of an organic diisocyanate and a crystalline polyesteramide with a melting point not exceeding 50° C., prepared from dicarboxylic acids and glycols, aminoalcohols or diamines in such proportions that from 8 to 64 moles of dicarboxylic acids are used for every mole of primary amino groups, said polyesteramide having an acid value of not more than 5 mg. KOH per g., preferably not more than 3 mg. KOH per g. and a water content of not more than 0.1% by weight, and in that said polyurethane elastomer has a Williams plasticity number of between 100 and 500.

The polyurethane elastomer used in the process of the present invention may be prepared by the general method and from the materials described in our U.S. application of Coulter et al., Serial No. 757,682 filed August 28, 1958, now abandoned. Thus the polyesteramides preferably have molecular weights of over 100, but generally not exceeding 5000. Suitable dicarboxylic acids for the preparation of the polyesteramides include succinic, glutaric, adipic, suberic, azelaic and sebacic acids as well as aromatic acids such as phthalic, isophthalic and terephthalic acids. Mixtures of acids may be used.

Examples of glycols for use in the preparation of the polyesteramides include ethylene glycol, 1:2-propylene glycol, diethylene glycol, tetramethylene glycol, pentamethylene glycol, hexamethylene glycol, decamethylene glycol and 2:2-dimethyltrimethylene glycol. Mixtures of glycols may used.

Amide groups are introduced by incorporating a proportion of a diamine or an amino-alcohol of which examples include ethylene diamine, hexamethylene diamine, monoethanolamine, phenylene diamine and benzidine.

As examples of organic diisocyanates that may be used in the preparation of the polyurethane elastomer there may be mentioned hexamethylene diisocyanate, diphenyl-4:4'-diisocyanate, dibenzyl-4:4'-diisocyanate, diphenylmethane diisocyanates, 4:4'-diisocyanato - 3 - methyldiphenylmethane, naphthylene-1:5-diisocyanate, m- and p-phenylene diisocyanates, and tolylene-2:4- and 2:6-diisocyanates. Mixtures of isocyanates may be employed.

The polyurethane elastomer may be prepared by conventional methods more fully described in the prior art. Thus for example the organic diisocyanate and the polyesteramide may be reacted together at temperatures of from 100° C. to 150° C. and the product homogenised on a rubber mill. The proportions of organic diisocyanate and polyesteramide used are such that the Williams plasticity number of the product lies between 100 and 550. Particularly useful polyurethane elastomers are those having Williams plasticity numbers of between 200 and 300. The proportions of diisocyanate and polyesteramide used to give the desired plasticity numbers normally lie between 0.8 and 1.2 molecular proportions of diisocyanate for each molecular proportion of polyesteramide. The Williams plasticity number is measured according to the method described in British Standard 1673; Part 3: 1951 (Methods of Testing Raw Rubber and Unvulcanised Compounded Rubber). The Williams plasticity number of the polyurethane elastomer may be decreased if necessary by mechanical working, for example by running the elastomer on a rubber mill.

The polyurethane elastomer may be dissolved in a variety of solvents or mixtures of solvents known from the prior art as suitable for dissolving uncured polyurethane elastomers, for example non-isocyanate reactive organic liquids such as mixtures of benzene, toluene and/or xylene with acetone, chloroform and/or methyl ethyl ketone, chlorinated solvents such as methylene dichloride, ethylene dichloride and mixtures thereof with methyl ethyl ketone, ketone solvents such as acetone, methyl ethylketone and cyclohexanone and ester solvents such as ethyl acetate. Solvents containing at least a proportion of a high boiling solvent such as ethoxyethyl acetate have been found to give particularly good adhesive compositions producing bonds of high strength, in particular when used to bond cured polyurethane rubbers to themselves and other materials.

Normally the polyurethane elastomer solution contains from 7.5% to 30% by weight of elastomer based on the weight of solvent.

In order to prepare the adhesive compositions used in the process of the present invention the solution of polyurethane elastomer is mixed with an organic polyisocyanate or mixture of organic polyisocyanates, which may if desired be added in a solvent such as one of those listed above. The proportion of organic polyisocyanates used is normally from 8% to 25% by weight of the weight of polyurethane elastomer depending on the particular polyisocyanate employed. Examples of organic polyisocyanates includes those isocyanates known from the prior art to be useful for the preparation of polyurethanes, for example those diisocyanates mentioned above as suitable for the preparation of the polyurethane elastomer. In addition polyisocyanates containing more than two isocyanate groups per molecule may be used. Examples of such polyisocyanates include the reaction products of an excess of diisocyanate with trihydric alcohols such as trimethylolpropane and glycerol and isocyanate group-containing isocyanurate polymers of diisocyanates, for example of tolylene-2:4-diisocyanate, as well as aromatic triisocyanates such as diphenyl ether-2:4:4'-triisocyanate and toluene-2:4:6-triisocyanate. Uretedione dimers of diisocyanates for example tolylene-2:4-diisocyanate may also be used.

In place of or in conjunction with the organic polyisocyanates there may be used adducts of such polyisocyanates which behave as the polyisocyanates themselves on heating: such adducts are described in the prior art relating to polyurethane manufacture and may be prepared by reacting polyisocyanates with compounds containing a reactive hydrogen atom such as mercaptobenzthiazole, diphenylamine, tert-butanol, acetoacetic ester and phenol.

The adhesive compositions may be applied by conventional means, for example by brushing or spraying to one, or preferably both, the surfaces of the materials to be bonded. The surfaces are then brought together preferably under light pressure, and normally after allowing most of the solvent to evaporate so as to produce a sticky surface coating. The adhesive composition is then cured by allowing to stand at room temperature, normally for 1 to 3 days, or by heating at temperatures of from 50° C. to 150° C., preferably from 100° to 125° C. Heating is necessary where a heat-decomposable isocyanate adduct is used as the curing agent and the precise temperature required to give the best results will depend on the particular adduct used.

The process of the present invention is suitable for the preparation of laminated materials from many materials such as natural rubber, latex foam, wood and homogeneous or cellular rigid plastic materials. However the present process has been found particularly suitable for the preparation of laminated articles from leather, cellular and homogeneous cured polyurethane elastomers and fabrics, for example from cotton, wool, silk, linen, rayon and synthetic polypropylene, polyester, and polyamide fibres. Thus valuable laminated materials may be prepared by bonding together two or more layers of leather, two or more layers of cured solid polyurethane elastomer, two or more layers of fabric, or one or more layers of fabric with one or more layers of cellular polyurethane elastomers.

The process as described above is not always entirely satisfactory for all purposes in that it may produce laminated produces which have diminished flexibility. This diminished flexibility appears to be at least partly due to penetration by the adhesive composition of one or both of the surfaces to be bonded.

It has been found that especially valuable laminated articles substantially free from the defect of inferior flexibility hereinbefore described, may be prepared by using the adhesive composition in the form of a dry film prepared beforehand, for example by casting said adhesive composition onto a surface, upon which the dry film is formed and from which it is subsequently transferred to one of the surfaces to be bonded.

Thus according to a further embodiment of the present invention there is provided an improved process for the manufacture of laminated articles which comprises carrying out the process of the present invention using the curable adhesive composition as a pre-formed dry film which is applied to at least one of the surfaces to be bonded.

The pre-formed dry film is normally of a thickness of between one and five thousandths of an inch although smaller and greater thicknesses may be used. The dry film of curable adhesive composition may be prepared by applying the curable adhesive composition to a non-adhesive, impermeable "carrier" surface from which the film may ultimately be readily removed, and allowing the adhesive composition to dry on said surface. Suitable "carrier" surfaces may be of, for example, polytetrafluoroethylene, polyethylene, polypropylene or high melting wax, supported where necessary on a rigid substrate, such as a metal sheet. Particularly effective results are obtained using a "carrier" surface comprising a silicone, especially a silicone elastomer, which is conveniently used in the form of a silicone treated fabric.

After application of a coating of the adhesive composition to the "carrier" surface the coating is allowed to dry during a short period: during this drying period the coating loses sufficient of the solvent for the polyurethane elastomer and organic polyisocyanate which is present to become dry. The drying period should preferably not be prolonged, particularly if carried out at elevated temperatures such that the organic polyisocyanate present is lost to any significant extent: such loss may occur for example by evaporation or by chemical reaction, leading to premature cure of the adhesive composition. Normally a drying period of about 1 minute at temperatures of about 120° C. is convenient although longer drying periods may be used at lower temperatures, for example up to 8 hours at 25° C.

The pre-formed dry film of adhesive may now be coated onto one of the surfaces to be bonded, most conveniently by pressing said film onto the surface to be bonded whilst the film is still on the "carrier" surface, and subsequently removing said "carrier" surface. The final stage of the process comprises bringing together the surface coated with the dry film and the second surface to be bonded, and curing the adhesive composition by the methods described above. Said second surface may also be pre-coated with a pre-formed dry film of the adhesive composition or, if desired, with a directly applied coating of the adhesive composition as described above, although the latter method in general gives less attractive results.

It is often advantageous, particularly when heat is not to be applied, to coat the dry film of adhesive with one of the solvents used to prepare the adhesive composition before said dry film is brought into contact with the second surface which is to be bonded.

The process of the present invention using a dry film of adhesive may be usefully employed in the manufacture of composite articles from a variety of materials such as have been described above. However the process has been found to give particularly advantageous results when used in the manufacture of laminated materials by bonding together layers of fabric to layers of flexible foamed material. Suitable fabrics include for example non-woven web, woven fabric and knitted fabrics based on the materials previously described. The process is particularly advantageous when applied to knitted fabrics which are difficult to use in conventional processes requiring spreading of the adhesive composition directly on to the fabric.

Suitable foamed materials include foamed polyvinyl chloride, foamed copolymers of butadiene, styrene and acrylonitrile, and, in particular, polyurethane foam.

It is preferred to transfer the dry film of adhesive composition from the "carrier" surface to the foamed material since this procedure generally gives better initial adhesion.

The process using a dry film of adhesive may be used to give laminated articles which are not permeable to air where the cured adhesive film is continuous. Alternatively a permeable film may be produced by forming the dry adhesive film on a "carrier" surface which possesses indentations and/or raised portions, and thereby obtaining a non-continuous adhesive film.

The process of the invention may conveniently be carried out by pre-forming the film onto a "carrier" surface in the form of a continuous band from whence the film is transferred to the surfaces to be bonded, said surfaces being carried on suitably disposed rollers.

The invention is illustrated but not limited by the following examples in which parts and percentages are by weight:

*Example 1*

A solution of 30 parts of a polyesteramide-diisocyanate reaction product in 80 parts of methylethyl ketone and 20 parts of ethoxyethyl acetate was mixed with 3.6 parts of 4:4' - diisocyanato - 3 - methyldiphenylmethane and brushed in a thin layer onto two strips of polyurethane-coated nylon, previously cleaned with acetone. The coated surfaces were allowed to stand for 30 minutes and then brought together and rolled down.

After curing during 3 days at room temperature an excellent bond was obtained between the polyurethane-coated nylon strips. Thus, using a one inch strip of the bonded material in a tensile testing machine having a jaw separation rate of 100 mm. per minute, a load to peel figure of 11 pounds was obtained. The load to peel figure was improved to 12½ pounds when the above procedure was repeated using polyurethane-coated nylon strips of which the surfaces had been previously roughened using sandpaper.

The polyesteramide-diisocyanate reaction product used in this example was the reaction product of a 65:35 mixture of tolylene-2:4- and 2:6-diisocyanates with an ethylene glycol/ethanolamine adipate having a melting point of less than 50° C., an acid value of 3.0 mg. KOH per gm. and a water content of less than 0.1%, and containing 16 moles of adipic acid for every mole of primary amino groups. The reaction product had a Williams plasticity number within the range of 200–350.

*Example 2*

A solution of 36 parts of a polyesteramide-diisocyanate reaction product in 75 parts of methylethyl ketone, was mixed with 7.2 parts of an ethyl acetate solution of an isocyanate-ended reaction product of glycerol, diethylene glycol and tolylene-2:4-diisocyanate. The resulting adhesive composition was spread onto a "carrier" surface comprising a silicone elastomer covering on a fabric base, using a conventional rubber spreading machine, and the adhesive composition dried by passing during about 30 seconds through a drying chamber at about 120° C., giving a dry film of the adhesive composition, having a thickness of 0.015 inch.

A length of ⅛ inch thick polyether-based polyurethane foam was rolled onto the dry film of adhesive, and the foam together with the adhering dry film then removed from the "carrier" surface. A length of knitted wool fabric carried on a roller heated to 110° C. was next laminated to the foam carrying the adhesive film, and the laminated material allowed to cure during between 3 and 4 days at room temperature.

A very soft, flexible laminated material was obtained, with an excellent bond between the foam and the knitted fabric.

The polyesteramide-diisocyanate reaction product used in this example was that used in the Example 1.

*Example 3*

A solution of 40 parts of a polyesteramide-diisocyanate reaction product, similar to that used in Example 1 but of Williams plasticity 150, in 55 parts of methyl ethyl ketone and 5 parts of ethoxy ethyl acetate was mixed with 8 parts of a 75% solution in ethyl acetate of a reaction product of glycerol and diethylene glycol with tolylene diisocyanate. The pot life of the mixed solution was two days at 20–22° C. and the solution was applied as an adhesive layer as in Example 1.

I claim:

1. A process for the manufacture of laminated articles which comprises bonding together at least two layers of material each selected from the group of materials consisting of natural rubber, wood, leather, fabrics, and cellular cured polyurethane elastomers by applying between said layers a curable adhesive composition comprising a solution of a polyurethane elastomer and an organic polyisocyanate, said polyisocyanate being used in an amount of from 8% to 25% by weight of the polyurethane elastomer, said polyurethane elastomer being the reaction product of between 0.8 and 1.2 molecular proportions of an organic diisocyanate and one molecular proportion of a crystalline polyesteramide with a melting point not exceeding 50° C., prepared from dicarboxylic acids, glycols and compounds selected from the group consisting of aminoalcohols and diamines in such proportions that from 8 to 64 moles of dicarboxylic acids are used for every mole of primary amino groups, said polyesteramide having an acid value of at most 5 mg. KOH per g. and a water content of at most 0.1% by weight, said polyurethane elastomer having a Williams plasticity number of between 100 and 550.

2. A process for the manufacture of laminated articles as claimed in claim 1 wherein the polyurethane elastomer has a Williams plasticity number of between 200 and 300.

3. A process for the manufacture of laminated articles as claimed in claim 1 wherein the solution of polyurethane elastomer is a solution in solvents containing at least a proportion of high boiling solvent.

4. A process for the manufacture of laminated articles as claimed in claim 3 in which said high boiling solvent is ethoxyethyl acetate.

5. A process for the manufacture of laminated articles as claimed in claim 1 wherein the polyurethane elastomer solution contains from 7.5% to 30% by weight of elastomer based on the weight of solvent.

6. A process for the manufacture of laminated articles as claimed in claim 1 wherein one of the laminated materials is a cellular foamed polyurethane material.

7. A process for the manufacture of laminated articles as claimed in claim 1 wherein the curable adhesive composition is used in the form of a pre-formed dry film which is applied to at least one of the surfaces to be bonded.

8. A process for the manufacture of laminated articles as claimed in claim 7 wherein the dry film of curable adhesive composition is prepared by applying the curable adhesive composition to a non-adhesive impermeable "carrier" surface and allowing the adhesive to dry on said surface.

9. A process for the manufacture of laminated articles as claimed in claim 8 wherein the "carrier" surface comprises a silicone.

10. A process for the manufacture of laminated articles as claimed in claim 9 in which the silicone is a silicone elastomer.

11. A process for the manufacture of laminated articles as claimed in claim 7 wherein the laminated materials comprise layers of flexible foamed material and of fabric.

12. A process for the manufacture of laminated articles as claimed in claim 11 in which the fabric is knitted fabric.

13. Laminated articles manufactured by the process claimed in claim 1.

References Cited by the Examiner

UNITED STATES PATENTS 2,905,852    9/1959    Coleman.

OTHER REFERENCES

"Silicones"; text copyright 1959 by Reinhold Publishing Co. (pages 33, 206–212).

EARL M. BERGERT, *Primary Examiner.*

E. G. WHITBY, *Assistant Examiner.*